United States Patent [19]

Mills

[11] Patent Number: 4,588,157
[45] Date of Patent: May 13, 1986

[54] POST SUPPORT

[75] Inventor: Derek J. Mills, South Glamorgan, Wales

[73] Assignee: Metpost Limited, Berkshire, England

[21] Appl. No.: 589,528

[22] Filed: Mar. 14, 1984

[30] Foreign Application Priority Data

| Mar. 14, 1983 | [GB] | United Kingdom | 8307009 |
| May 27, 1983 | [GB] | United Kingdom | 8314836 |
| Aug. 8, 1983 | [GB] | United Kingdom | 8321322 |
| Feb. 2, 1984 | [GB] | United Kingdom | 8402848 |

[51] Int. Cl.⁴ .............................................. F16M 13/00
[52] U.S. Cl. ..................................... 248/545; 52/165; 52/298; 248/530; 403/13; 403/283; 403/361
[58] Field of Search ............... 248/544, 545, 546, 530, 248/533, 156; 52/165, 298, 726; 403/361, 282, 283, 13; 144/254 D, 254 E, 193 R, 159

[56] References Cited

U.S. PATENT DOCUMENTS

| 50,782 | 10/1865 | Ralya | 144/159 |
| 704,819 | 7/1902 | East | 403/282 |
| 2,039,779 | 5/1936 | Cote | 248/530 X |
| 2,279,995 | 4/1942 | Jones | 403/283 |
| 3,767,355 | 10/1973 | Anderson, Jr. | 248/156 X |
| 3,872,578 | 3/1975 | Ullom | 403/282 X |
| 3,950,825 | 4/1976 | Manhes | 403/361 X |
| 4,271,646 | 6/1981 | Mills | 52/165 |
| 4,324,388 | 4/1982 | Klaser | 52/165 X |
| 4,483,506 | 11/1984 | Litwiller | 248/156 X |

FOREIGN PATENT DOCUMENTS

| 480912 | 3/1938 | United Kingdom . |
| 703783 | 2/1954 | United Kingdom . |
| 2030613A | 4/1980 | United Kingdom . |

Primary Examiner—J. Franklin Foss
Assistant Examiner—David L. Talbott
Attorney, Agent, or Firm—Scully, Scott, Murphy & Presser

[57] ABSTRACT

A post support comprises an elongate ground engaging portion, preferably a cruciform cross section, capable of being driven vertically into the ground, and a post engaging portion attached to the ground engaging portion and in the form of a hollow box section for receiving one end of a post to be supported in a vertical position and with its axis substantially parallel to the axis of the ground engaging portion, wherein the hollow box section is formed with means, integral therewith, other than means for adjusting the size of the box section, for enabling an undersized post to be rigidly supported in the box section and/or for removing excess post material from an oversized post. Means for removing excess material from an oversized post may comprise a bevelled edge formed on the top surface of at least one wall of the box section to present a chisel edge to a post being driven into the box section. Means for enabling an undersized post to be rigidly supported in the box section preferably comprise an upstanding projection or plurality of projections on the inner surface of at least one wall of the box section whereby the interior dimensions of the box section are effectively reduced. Preferably the projections comprise vertical flanges produced by punching out a section of the wall of the box section and bending the punched section inwardly of the box section.

5 Claims, 10 Drawing Figures

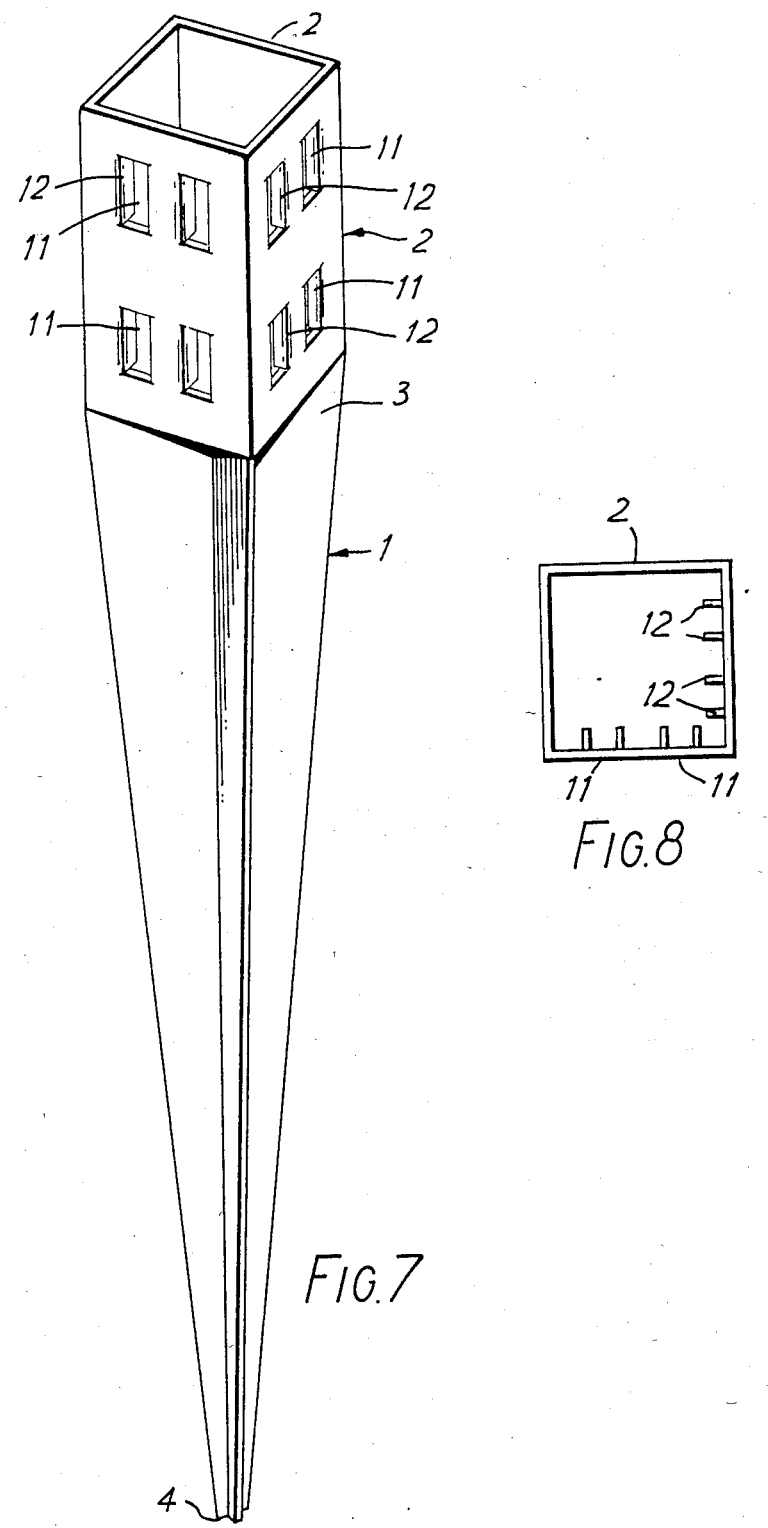

POST SUPPORT

BACKGROUND OF THE INVENTION

This invention relates to means for supporting vertical posts, for example, posts for supporting fencing or the like, sign boards, stakes for supporting plants, etc.

UK Patent Specification No: 1461802 relates to a post support comprising an elongate ground engaging portion capable of being driven vertically into the ground and a vertical post engaging portion rigidly attached to the ground engaging portion and so formed that a post to be supported and engaged by, for example, attached to or received in, the post engaging portion extends vertically and with its axis substantially parallel to the axis of the ground engaging portion.

In the preferred form of post support, the post engaging portion is a hollow box section within which the post to be erected can be received.

Wooden posts, although cut to a nominal size, are frequently over or under size and, accordingly, if the box section of the post support is dimensioned to receive a 3" post, for example, an under sized post is a loose fit in the box section and must be wedged if the post is to be supported rigidly in a vertical position and an over sized post must be planed down, or otherwise reduced in size, at the end to be received in the box section.

SUMMARY OF THE INVENTION

According to the invention, a post support comprising an elongate ground engaging portion capable of being driven vertically into the ground, and a post engaging portion attached to the ground engaging portion and in the form of a hollow box section for receiving one end of a post to be supported in a vertical position and with its axis substantially parallel to the axis of the ground engaging portion wherein the hollow box section is formed with means, integral therewith, other than means for adjusting the size of the box section for enabling an under-sized post to be rigidly supported in the box section and/or for removing excess post material from an over-sized post.

Means for removing excess material from an oversized post preferably comprises a bevelled edge formed on the top surface of at least one wall, and preferably of two adjacent walls, of the box section, which bevelled edge(s) present(s) a chisel edge to a post being driven into the box section. Preferably any wall with a bevelled top surface is lower than any un-bevelled wall so that the portion of any other wall(s) extending above the bevelled edge will serve to guide the post as it is driven into the box section.

Means for enabling an under-sized post to be rigidly supported in the box section preferably comprise an upstanding projection or plurality of projections on the inner surface of at least one wall and preferably of two adjacent walls of the box section. For support of a fence post, it is only necessary that the post be prevented from movement in any direction perpendicular to the plane of the fence, since movement in the direction of the plane of the fence is prevented by the fence panels themselves on either side of the post. Accordingly, it is necessary only that projections need be formed in one side portion of the hollow box section provided that when the post support is introduced into the ground the projections are aligned so as to prevent undesired movement of the fence post perpendicular to the plane of the fence. Although projections need only be present on one side of the box section preferably they are present on two adjacent sides, although they may be present on three, or even all four sides of a rectangular box section. In the case of a circular box section there is only a need for projections in one location on the wall, although, of course they may be present in two or more spaced locations.

The projections are integral with the wall of the box section and may be formed by deforming the wall inwardly, for example, by pressing or they may be formed separately from the wall and adhered thereto, for example by welding. When formed by deforming the walls of the box section the projections may simply be pressed into the wall of the box section or they may be punched out of the wall of the box section leaving an aperture in the wall, with the cut out portion of the wall turned inwardly of the box section. The projections may, for example, comprise ribs or pimples or any combination thereof with corresponding grooves or dimples on the outer wall of the box section or they may comprise inwardly projecting flanges, barbs or tangs or the like punched out of the wall of the box section and optionally in combination with indented portions in the wall.

Inwardly projecting flanges preferably extend vertically since they will then tend to cut into the post material as the post is driven into the box section. They may, however, be arranged horizontally in which case they will normally be deformed as the post is driven into the box section, or they will scrape away some of the material of the post. An upwardly extending tang may be provided with a bevelled edge so that the material of the post is chiselled away as the post is driven into the box section. In such a case, the wall of the box below the tang is preferably deformed inwardly to such an extent that the groove formed in the post by the chiselled edge fits snugly over the deformed portion of the wall.

The box section may be mounted on the ground engaging portion in such a way as to allow minor adjustment of the box section relative to the ground engaging portion after the ground engaging portion has been driven into the ground, for example, the box section may be mounted on the ground engaging portion by an arrangement similar to that shown in Specification No: GB 2111153A, or as described in our co-pending Application No: 8308486.

Preferably, however, the box section is rigidly attached to the ground engaging portion, for example by welding.

The projections may be of any size or shape capable of accommodating the cutting tolerances normally found in fencing posts.

In the case of a post which is not under size or which is under size by less than the maximum allowed for is driven into the box section, the projections will either cut into the post or they will be deformed by the material of the post so that they do not interfere with entry of the post into the box section.

The ground engaging portion may be of any desired configuration but is preferably of cruciform section, which may be a trifin cross but is preferably a saltire. When the ground engaging portion has a saltire section the arms of the saltire preferably extend diagonally of a rectangular box section.

BRIEF DESCRIPTION OF THE DRAWINGS

The invention will now be described in greater detail by way of example with reference to the drawings in which:

FIG. 7 is a perspective view of a fourth form of post support according to the invention;

FIG. 8 is a plan view of the post support of FIG. 7.

DETAILED DESCRIPTION OF THE PREFERRED EMBODIMENTS

Figures 1, 2:
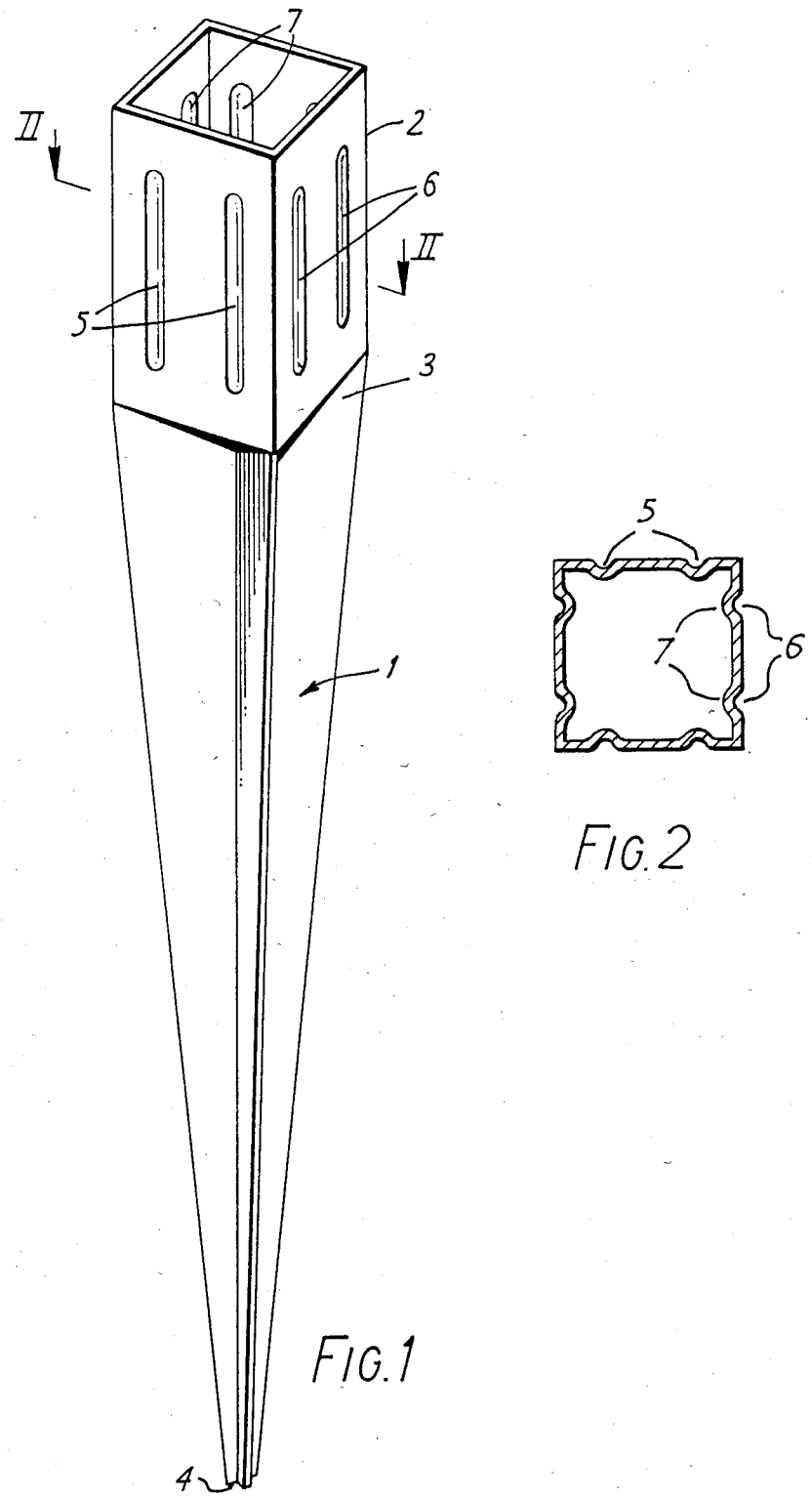
FIG. 1 is a perspective view of one form of post support according to the invention.
FIG. 2 is a plan view on line II—II in FIG. 1.

As shown in FIG. 1 the post support comprises a ground engaging portion 1 and a post engaging portion 2 of hollow rectangular box section. The ground engaging portion 1 is of cruciform cross section and tapers from the top end 3 at which the post engaging portion 2 is located to the free end 4.

Each wall of the box section is provided with two spaced apart inwardly depressed portions 5 forming a depression 6 on the outside wall and a projection 7 on the inner wall. The projections extend vertically from a point adjacent the closed end 3 of the box to a point adjacent the open end of the box. In the case of a box section 6" high, the projections 5 may extend from a point about 1" above the base to a point about 1" below the open end. For use with a nominal 3" square post, the box section 2 will have an internal cross section with 3" long sides and a projection is, for example, formed with a center approximately 1" from each corner and hence the projections on each side are spaced by approximately 2".

Figure 3:
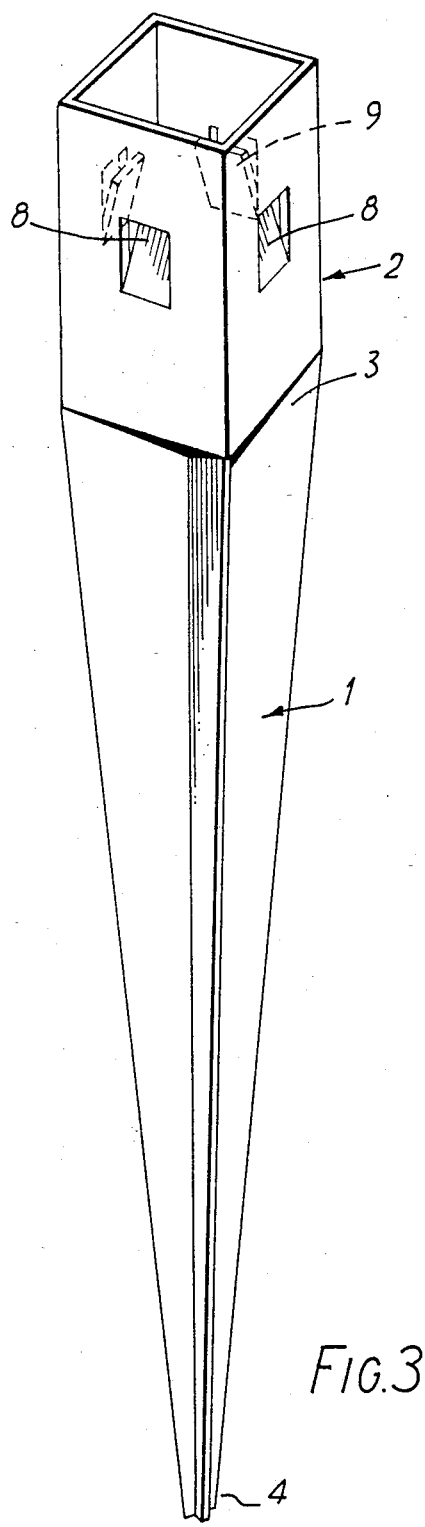
FIG. 3 is a perspective view of a second form of post support according to the invention.
Figure 4:
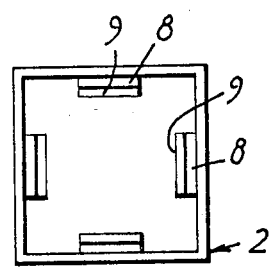
FIG. 4 is a plan view of the post support of FIG. 3.

As shown in FIGS. 3 and 4, in each wall of the box section 2 is an inwardly depressed portion 8, which is stamped out of the wall by cutting round three sides of a rectangular portion. The top edge 9 of each portion 8 is provided with a bevelled cutting edge.

Figure 5:
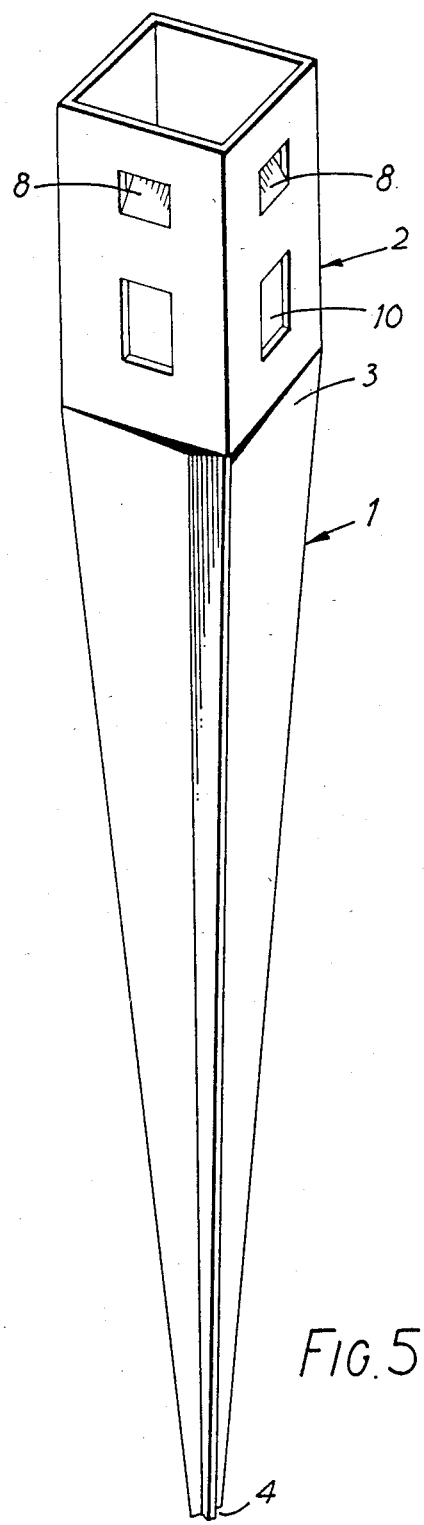
FIG. 5 is a perspective view of a third form of post support according to the invention.
Figure 6:
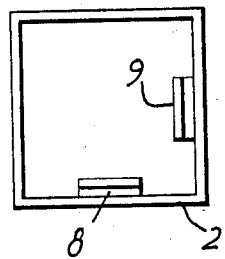
FIG. 6 is a plan view of the post support of FIG. 5.

As shown in FIGS. 5 and 6, the post support is similar to that shown in FIGS. 3 and 4 except that inwardly depressed portions 8 are formed on only two adjacent sides of the box section 2, and the height of these depressed portions 8 is reduced. Immediately below each inwardly depressed portion 8 is an indented portion 10 of width equal to that of the portion 8 and able to be received within the channel section cut out of a post by the bevelled cutting edge 9 of the portion 8.

As shown in FIGS. 7 and 8, on each of two adjacent walls of the box section 2 are four stamped out portions 11. These portions 11 are each formed by making two horizontal cuts and a vertical cut extending between the midway points of the horizontal cuts and then pressing the two tabs 12 that are so formed inwardly of the box until they extend perpendicular to the walls.

Figures 9, 10:
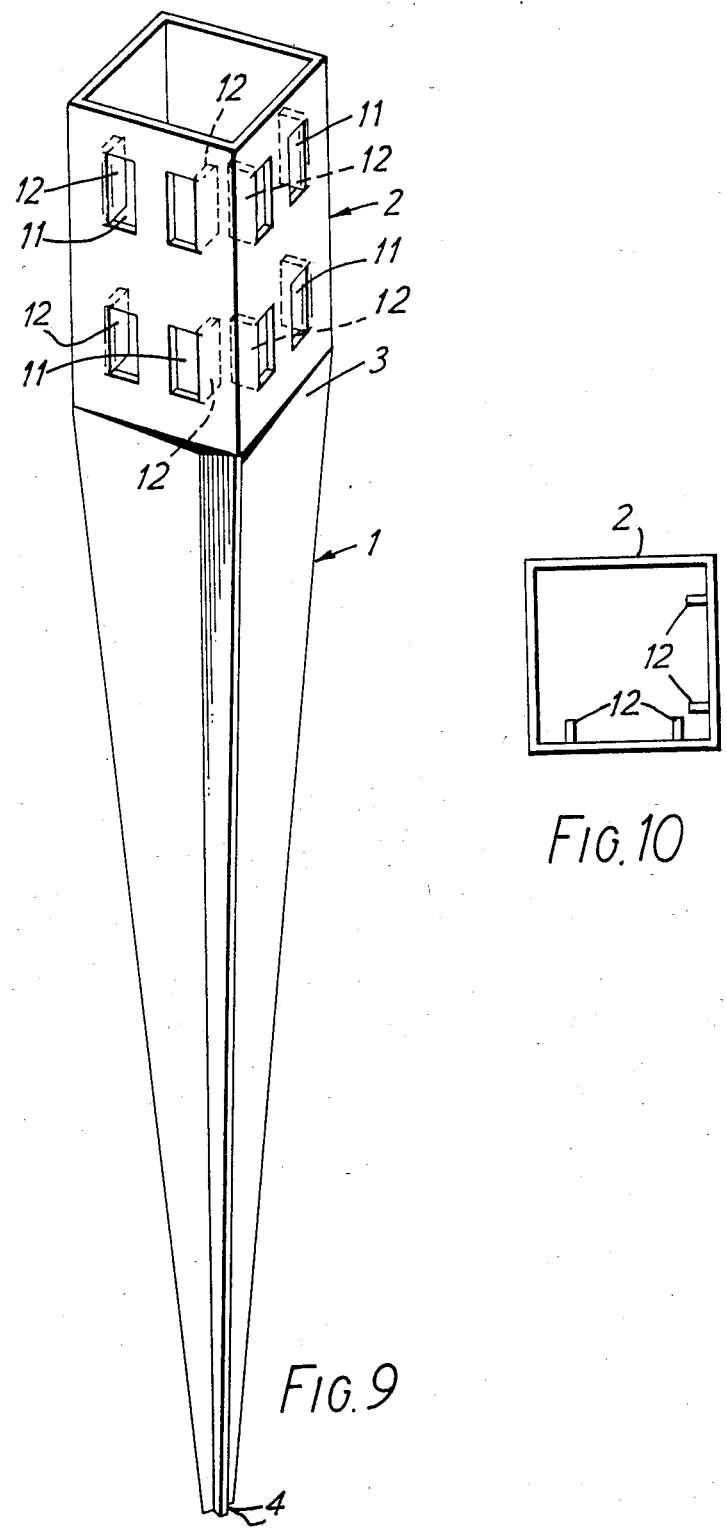
FIG. 9 is a perspective view of a fifth form of post support according to the invention.
FIG. 10 is a plan view of the post support of FIG. 9

As shown in FIGS. 9 and 10, the arrangement is similar to that of FIGS. 7 and 8 except that each stamped out portion 11 forms only a single tab 12 instead of a pair of tabs.

What is claimed is:

1. A post support for a fence or building post, comprising an elongate ground engaging portion capable of being driven vertically into the ground, and a post engaging portion attached to the ground engaging portion and in the form of a hollow box section for receiving one end of a post to be supported in a vertical position and with its axis substantially parallel to the axis of the ground engaging portion, wherein:

the hollow box section is formed with means, integral therewith, other than means for adjusting the size of the box section for enabling an under-sized post to be rigidly supported in the box section;

said means for enabling an under-sized post to be rigidly supported in the box section comprises a first vertical projection extending inward from a wall of the box section to cut into the post as it is being driven into the box section;

said wall comprises a through opening including
(i) first and second horizontal edges extending through the wall, and
(ii) a vertical edge extending through the wall between first ends of the first and second horizontal edges; and the first vertical projection is formed by bending inward a portion of the wall bounded by the first and second horizontal edges and said vertical edge.

2. A post support according to claim 1 wherein:

said means for enabling an under-sized post to be rigidly supported in the box section further comprises a second vertical projection extending inward from the wall also to cut into the post as it is being driven into the box section;

said wall comprises a through opening including
(i) first and second horizontal edges extending through the wall,
(ii) a first vertical edge extending through the wall between first ends of the first and second horizontal edges, and
(iii) a second vertical edge extending through the wall between second ends of the first and second horizontal edges;

the first vertical projection is perpindicular to the wall and is formed by bending inward a first portion of the wall between the first and second horizontal edges and the first and second vertical edges; and the second vertical projection is perpindicular to the wall and is formed by bending inward a second portion of the wall between the first and second horizontal edges and the first and second vertical edges.

3. A post support according to claim 1 wherein the first vertical projection is perpendicular to the wall.

4. A post support for a fence or building post, comprising an elongae ground engaging portion capable of being driven vertically into the ground, and a post engaging portion attached to the ground engaging portion and in the form of a hollow box section for receiving one end of a post to be supported in a vertical position and with its axis substantially parallel to the axis of the ground engaging portion, wherein:

the hollow box section is formed with means, integral therewith, other than means for adjusting the size of the box section, for enabling an under-sized post to be rigidly supported in the box section;

said means for enabling an under-sized post to be rigidly supported in the box section comprises (i) a first vertical projection extending inward from a first wall of the box section to cut into a first side of the post as it is being driven into the box section, and (ii) a second vertical projection extending inward from a second wall of the box section, said second wall being adjacent said first wall, to cut into a second side of the post as it is being driven into the box section;

said first wall comprises a first through opening including (i) first and second horizontal edges extending through the first wall, and (ii) a first vertical edge extending through the first wall, between first ends of the first and second horizontal edges;

the first vertical projection is formed by bending inwward a portion of the first wall bounded by the first and second horizontal edges and said vertical edge;

said second wall comprises a second through opening including (i) third and fourth horizontal edges extending through the second wall, and (ii) a second vertical edge extending through the second wall, between first ends of the third and fourth horizontal edges; and the second vertical projection is formed by bending inward a portion of the second wall bounded by the third and fourth horizontal edges and the second vertical edge.

5. A post support according to claim 4 wherein:

the first vertical projection is perpendicular to the first wall; and the second vertical projection is perpendicular to the second wall.

* * * * *